(12) United States Patent
Trombley et al.

(10) Patent No.: US 12,547,809 B2
(45) Date of Patent: Feb. 10, 2026

(54) BIT FLIP AWARE LATCH PLACEMENT

(71) Applicant: INTERNATIONAL BUSINESS MACHINES CORPORATION, Armonk, NY (US)

(72) Inventors: Benjamin Neil Trombley, Hopewell Junction, NY (US); Chung-Lung K. Shum, Wappingers Falls, NY (US); Paul G. Villarrubia, Austin, TX (US); K. Paul Muller, Wappingers Falls, NY (US); Michael Hemsley Wood, Wilmington, DE (US); Daniel Arthur Gay, Lagrangeville, NY (US); Hua Xiang, San Jose, CA (US); Karl Evan Smock Anderson, Poughkeepsie, NY (US); Erica Stuecheli, Austin, TX (US); Michael Alexander Bowen, Poughkeepsie, NY (US); Randall J. Darden, Ridgedale, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 721 days.

(21) Appl. No.: 17/934,216

(22) Filed: Sep. 22, 2022

(65) Prior Publication Data
US 2024/0104282 A1 Mar. 28, 2024

(51) Int. Cl.
*G06F 30/392* (2020.01)
*G06F 30/398* (2020.01)
(52) U.S. Cl.
CPC .......... *G06F 30/392* (2020.01); *G06F 30/398* (2020.01)

(58) Field of Classification Search
CPC ......... H10D 89/10; G06F 30/30; G06F 30/39; G06F 30/392; G06F 30/398; G06F 30/347
USPC ....................................................... 716/122
See application file for complete search history.

(56) References Cited

U.S. PATENT DOCUMENTS

| 8,468,484 B2 | 6/2013 | Lilja |
| 9,021,238 B2 | 4/2015 | Chang |
| 9,041,428 B2 | 5/2015 | Huott |
| 9,043,683 B2 | 5/2015 | Huott |

(Continued)

FOREIGN PATENT DOCUMENTS

CN 104268347 A 1/2015

OTHER PUBLICATIONS

Blum, Daniel Ryan, "Hardened by Design Approaches for Mitigating Transient Faults in Memory-Based Systems," Thesis, Washington Statue University, May 2007.

(Continued)

*Primary Examiner* — Paul Dinh
(74) *Attorney, Agent, or Firm* — Rakesh Roy (57) ABSTRACT

A method, system, and computer program product for bit flip aware latch placement in integrated circuit generation are provided. The method identifies a chip design for an integrated circuit. A set of chip design constraints, associated with the chip design, is identified. A set of checking groups, associated with a plurality of latches to be placed in the chip design, is determined. Based on the set of chip design constraints and the set of checking groups, a placement scheme for the plurality of latches is selected. The method places the plurality of latches within the chip design based on the placement scheme and the set of checking groups.

20 Claims, 5 Drawing Sheets

(56) References Cited

U.S. PATENT DOCUMENTS

| | | | |
|---|---|---|---|
| 9,083,341 B2 | 7/2015 | Lilja | |
| 9,483,591 B1 | 11/2016 | Arbel | |
| 2004/0107408 A1* | 6/2004 | Sano | G06F 30/327 |
| | | | 716/104 |
| 2007/0240087 A1* | 10/2007 | Ishihara | G06F 30/30 |
| | | | 716/113 |
| 2009/0193376 A1* | 7/2009 | Alpert | G06F 30/394 |
| | | | 716/119 |
| 2021/0073344 A1* | 3/2021 | Surprise | G06F 30/392 |

OTHER PUBLICATIONS

Hochschild et al., "Cores that don't count," HotOS '21, ACM, 2021, pp. 9-16.
Saremi, Kiarash, et al., "SeaPlace: Process Variation Aware Placement for Reliable Combinational Circuits against SETs and METs," arXiv preprint arXiv:2112.04136 (2021), 14 pages.
Seifert et al., "On the Radiation Induced Soft Error Performance of Hardened Sequential Elements in Advanced Bulk CMOS Technologies," IEEE SELSE 6 Workshop Proceedings, IEEE, 2010, 12 pages.
Intel, Embedded Memory (RAM:1-PORT, RAM: 2-PORT, ROM: 1-PORT and ROM: 2_PORT) User Guide, Sep. 17, 2021, 50 pages.

\* cited by examiner

BIT FLIP AWARE LATCH PLACEMENT

BACKGROUND

Storage elements, such as latches and registers, are susceptible to bit flips due to external forces. A bit flip may be a memory error in which a bit unintentionally changes in a storage element such as a memory. A bit flip may occur when copying or writing data to the storage element. Some current systems provide protection mechanisms that include parity usage, detection schemes, and error correction codes. Current systems often group storage elements into a checking group to employ these error correction mechanisms.

SUMMARY

According to an embodiment described herein, a computer-implemented method for bit flip aware latch placement in integrated circuit generation is provided. The method identifies a chip design for an integrated circuit. A set of chip design constraints, associated with the chip design, is identified. A set of checking groups, associated with a plurality of latches to be placed in the chip design, is determined. Based on the set of chip design constraints and the set of checking groups, a placement scheme for the plurality of latches is selected. The method places the plurality of latches within the chip design based on the placement scheme and the set of checking groups.

According to an embodiment described herein, a system for bit flip aware latch placement in integrated circuit generation is provided. The system includes one or more processors and a computer-readable storage medium, coupled to the one or more processors, storing program instructions that, when executed by the one or more processors, cause the one or more processors to perform operations. The operations identify a chip design for an integrated circuit. A set of chip design constraints, associated with the chip design, is identified. A set of checking groups, associated with a plurality of latches to be placed in the chip design, is determined. Based on the set of chip design constraints and the set of checking groups, a placement scheme for the plurality of latches is selected. The operations place the plurality of latches within the chip design based on the placement scheme and the set of checking groups.

According to an embodiment described herein, a computer program product for bit flip aware latch placement in integrated circuit generation is provided. The computer program product includes a computer-readable storage medium having program instructions embodied therewith, the program instructions being executable by one or more processors to cause the one or more processors to identify a chip design for an integrated circuit. A set of chip design constraints, associated with the chip design, is identified. A set of checking groups, associated with a plurality of latches to be placed in the chip design, is determined. Based on the set of chip design constraints and the set of checking groups, a placement scheme for the plurality of latches is selected. The operations place the plurality of latches within the chip design based on the placement scheme and the set of checking groups.

DETAILED DESCRIPTION

The present disclosure relates generally to methods for automated latch placement in integrated circuit generation. More particularly, but not exclusively, embodiments of the present disclosure relate to a computer-implemented method for automated bit flip aware latch placement in integrated circuit generation. The present disclosure relates further to a related system for automated latch placement in integrated circuit generation, and a computer program product for operating such a system.

Latches and registers are susceptible to bit flips due to external forces, such as alpha particles and gamma rays. A bit flip may be a memory error in which a bit unintentionally changes, such as a bit changing from a zero to one. These bit flips may be known as soft errors in storage elements. Undetected bit flips may lead to data corruption, program abend, or system outages. Current systems protect against bit flips using parity mechanisms, one-hot detection schemes, and error correction codes (ECC), among others. Storage elements may be grouped into checking groups to employ these error correction mechanisms. Parity and one-host checking schemes are often used, as these schemes encounter less overhead when compared to ECC schemes. Although these schemes may detect single bit flip instances, two or more simultaneous bit flips in a same checking group may remain undetected.

While multiple bit flip errors occur in storage elements such as static random-access memory (SRAM) due to storage device density, current mitigation efforts are often focused on human engineering. For example, human engineered logic and placement may be employed in such customized areas to arrange storage cell placement in effort to avoid multiple bit flips. Such human-based mitigation tactics are limited by storage element size and complexity. As design feature sizes decrease and additional latches and registers are employed in modern technologies, human-based place and route flows are increasingly susceptible to multiple bit flips. For example, 7 nanometer (nm) architecture may include nodes where latches are small enough to be susceptible to multiple bit flip errors. Similarly, 7 nm and 5 nm fin field-effect transistors (FinFET) may be more susceptible to multiple bit flip errors than 14 nm FinFET on silicon-on-insulator (SOI). In addition to focusing on human-based design efforts, current systems often use error detection and mitigation schemes which are slow and consume more power than practical for full implementation in integrated circuits. While systems using parity checking, such systems are limited to single bit correct and dual bit detect capabilities. Systems using ECC may have additional capabilities to parity checking, ECC is far more expensive in logic and power overhead.

The present disclosure provides automated latch and register placement techniques. These automated placement techniques are aware of parity and one-host checking groups. These automated placement techniques are also multiple bit flip aware in placement of latches and registers. Some embodiments of the present disclosure enable placing of structured storage cells and engage new algorithms to ensure same-group latches are not vertically abutting. Further, some embodiments of the present disclosure assure reliability of chip design and storage element placement without human intervention. Embodiments of the present disclosure have minimal impact on empty space and power consumption across chip designs when compared to designs ignoring multiple bit flip errors.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer readable storage media. The computer readable storage media may interact with other components of the system to cause the system to execute program instructions comprising operations of the computer-implemented method, described herein. For the purpose of this description, a computer-usable or computer readable medium may be any apparatus that may contain means for storing, communicating, propagating, or transporting the program for use, by, or in connection with, the instruction execution system, apparatus, or device.

Figure 1:
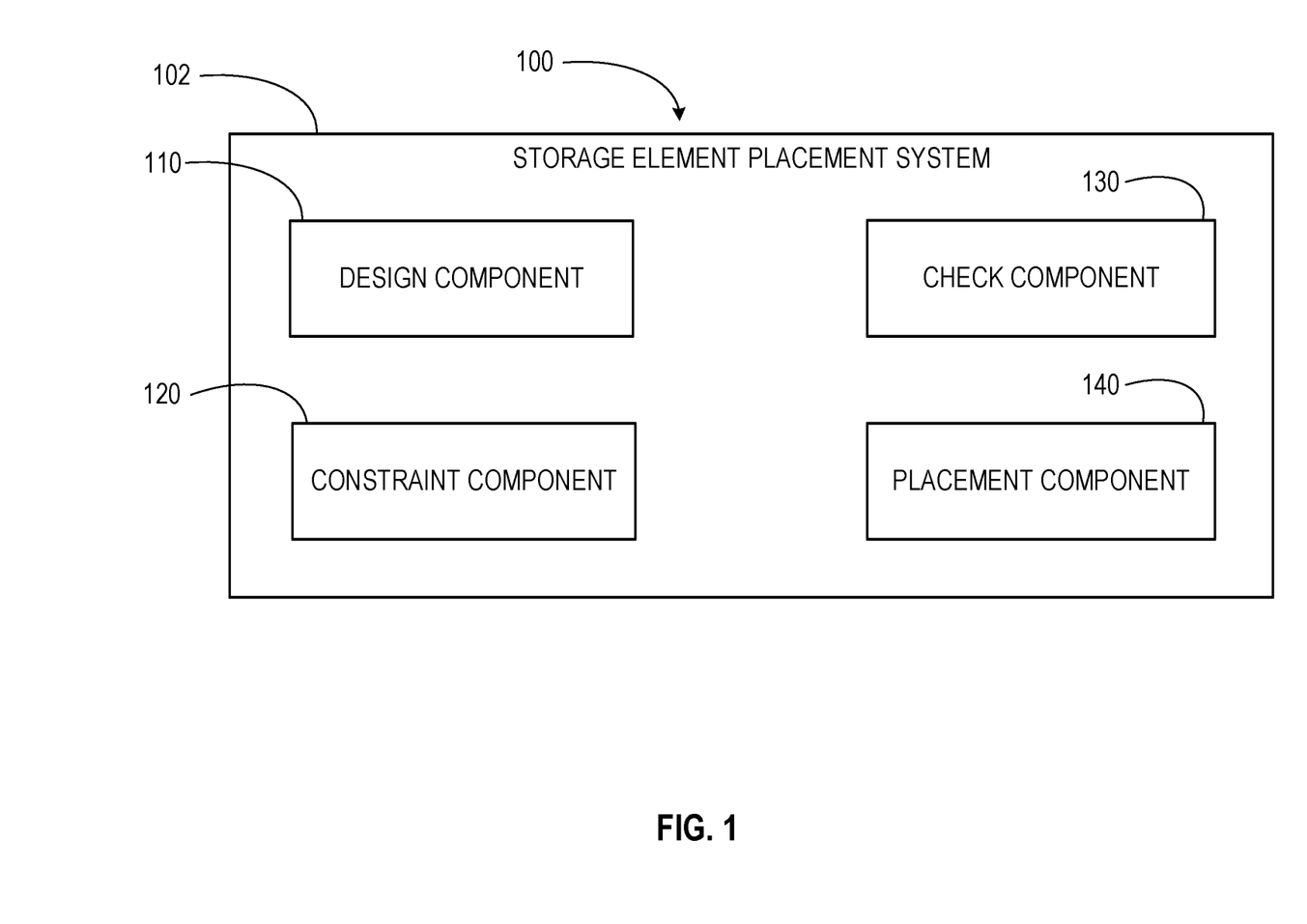
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a storage element placement system 102. The storage element placement system 102 may comprise a design component 110, a constraint component 120, a check component 130, and a placement component 140. The design component 110 identifies chip designs for inclusion in integrated circuits. The constraint component 120 identifies sets of chip design constraints for identified chip designs. The check component 130 determines checking groups and sets of checking groups associated with storage elements to be placed within the chip design. The placement component 140 selects placement schemes and places storage elements within designated chip designs according to chip design constraints. Although described with distinct components, it should be understood that, in at least some embodiments, components may be combined or divided, and/or additional components may be added without departing from the scope of the present disclosure.

Figure 2:
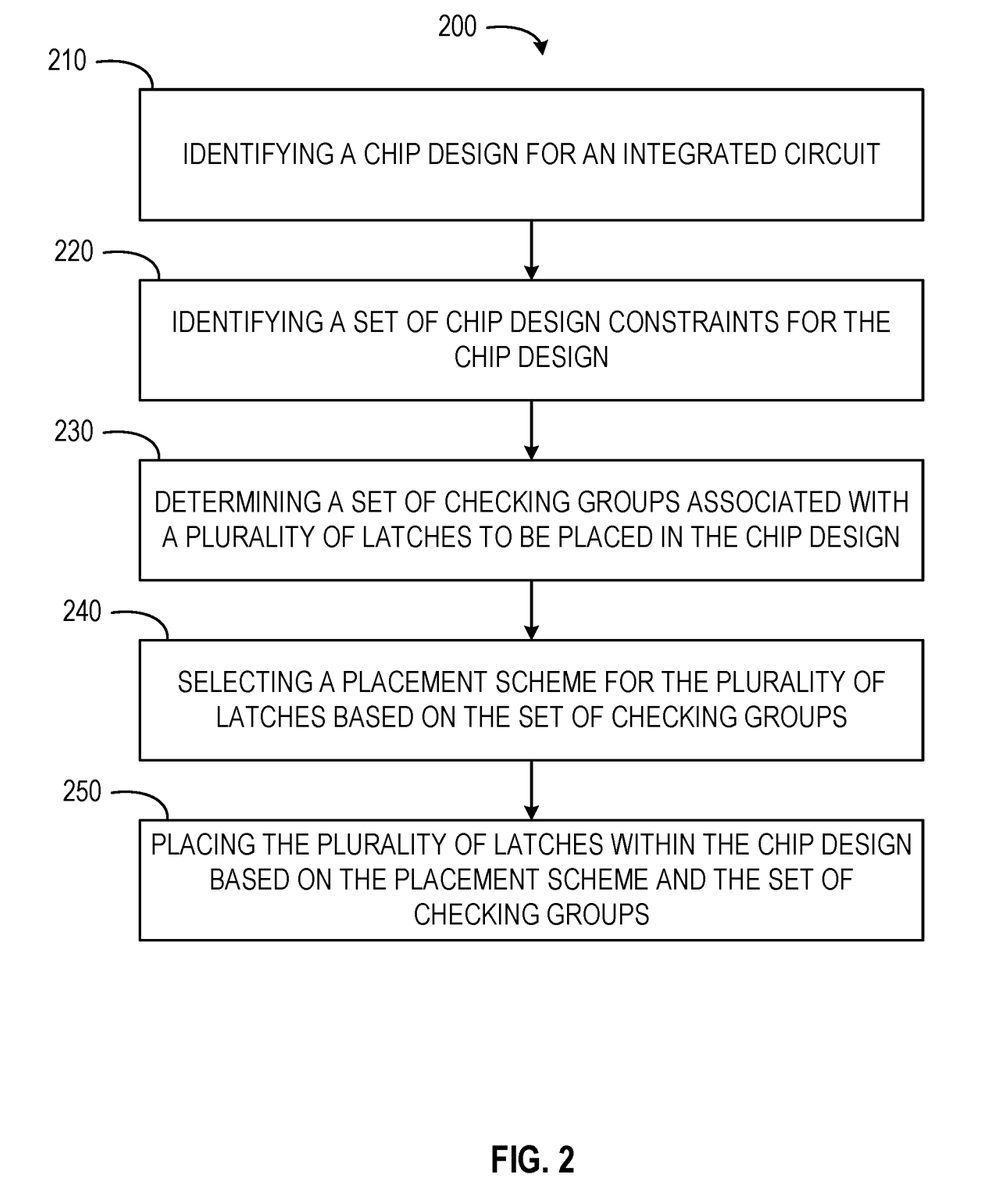
FIG. 2 depicts a flow diagram of a computer-implemented method for bit flip aware latch placement in integrated circuit generation, according to at least one embodiment.

Referring now to FIG. 2, a flow diagram of a computer-implemented method 200 is shown. The computer-implemented method 200 is a method for bit flip aware latch placement in integrated circuit generation. In some embodiments, the computer-implemented method 200 may be performed by one or more components of the computing environment 100, as described in more detail below.

Figure 3A:
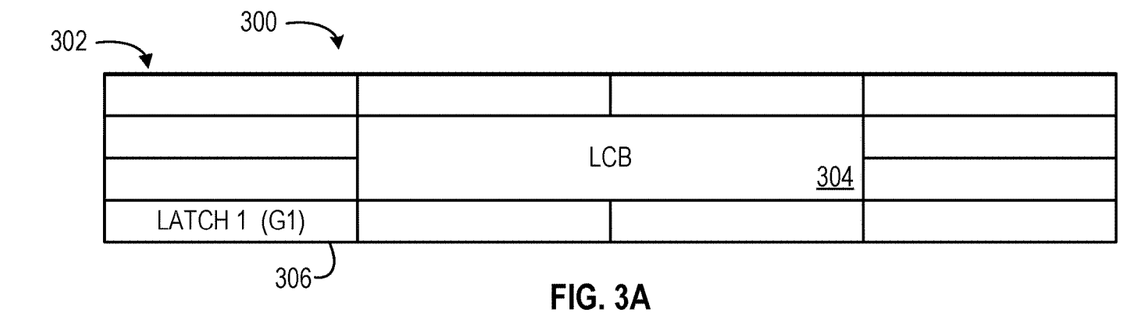
FIG. 3A depicts a block diagram of latch placement in an integrated circuit, according to at least one embodiment.

At operation 210, the design component 110 identifies a chip design for an integrated circuit. FIG. 3A shows a block diagram of a chip design 300. In some embodiments, the design component 110 identifies the chip design by receiving the chip design from a user of the storage element placement system 102. In some instances, the design component 110 retrieves a chip design from a design repository or database. The chip design may be retrieved based on a user input. Retrieval of the chip design may be triggered by generation of at least a portion of the chip design by a chip design system. The chip design system may be part of or in communication with the design component 110 of the storage element placement system 102.

At operation 220, the constraint component 120 identifies a set of chip design constraints. The set of chip design constraints may be associated with the chip design identified in operation 210. For example, as shown in FIG. 3A, design constraints may include a chip design size limited to a bounding box 302, and a local clock buffer 304 positioned centrally within the bounding box 302. The constraints may also identify parity settings, latches to be used, parity assignments for the latches, or any other relevant constraint. The constraint component 120 may identify the set of chip design constraints from the chip design, files or metadata associated with the chip design, or documentation of the chip design. In some embodiments, the constraint component 120 identifies the set of chip design constraints by analyzing input, output, and other characteristics of the chip design or a portion thereof. In such instances, the constraint component 120 may analyze a portion of the chip design available for storage element placement to determine the set of chip design constraints from connections between the portion of the chip design for storage element placement and other portions of the chip design. The set of chip design constraints may include pre-defined constraints leading to potential multi-bit flips.

At operation 230, the check component 130 determines a set of checking groups. The set of checking groups may be associated with a plurality of latches to be placed in the chip design. In some embodiments, each latch of the plurality of latches is associated with one checking group of the set of checking groups. In some embodiments, the check component 130 determines the set of checking groups from the chip design or data associated therewith.

At operation 240, the placement component 140 selects a placement scheme for the plurality of latches. In some embodiments, the placement scheme is selected based on the set of chip design constraints. The placement scheme may be selected based on the set of checking groups. In some instances, the placement scheme is selected based on a combination of the set of chip design constraints and the set of checking groups. The placement component 140 may select the placement scheme from a group consisting of a latch grouping scheme and an integer solving scheme. Although discussed with respect to specified placement schemes, it should be understood that the placement component 140 may select other relevant and suitable placement schemes. The placement component 140 may use the placement schemes on yet-to-be-placed latches and registers, based on a structured nature of the placement scheme. The placement schemes may also be used on the yet-to-be-placed latches and registers based on a structured nature of some circuit designs. For example, latch placements may occur in structured banks of columns and rows within a physical circuit for clock tree synthesis or built around a clock buffer. In some embodiments, the placement component 140 uses the placement scheme to modify an existing layout of latches and produce a new layout that adheres to the design constraints.

At operation 250, the placement component 140 places the plurality of latches within the chip design. In some embodiments, the plurality of latches is placed based on the placement scheme and the set of checking groups. The plurality of latches may also be placed based on a physical structure of the circuit design, such as the bounding box 302 of FIG. 3A. In some instances, latches protected by being in a same checking group or parity checking group are placed apart in vertical and horizontal positions. The placement component 140 may put parity on latches in a horizontal direction. This orientation may be preferable due to a layout of latches and physical dimensions. This may separate sensitive nodes further apart. As such, parity may be placed on horizontal latches, instead of vertical latches, due to physical dimensions of some latches. Spaces between parity protected latches may be used to place other latches with other parity protection. The placement component 140 may intersperse latches which do not need any protection between latches which do. The interspersed latches, needing no protection, may not hold critical data. In some instances, where no other solution is available, the placement component 140 may leave space between latches unused to maintain protection against multi-bit flip errors.

In embodiments where the placement component 140 employs a latch grouping scheme, the placement component 140 groups the plurality of latches into a set of latch groups. The placement component 140 may group the plurality of latches into groups based on a checking group associated with each latch. The set of latch groups may be understood as buckets or groupings of latches or registers. The buckets or latch groupings may be parity buckets. Latches or registers within a same latch group or bucket may be latches or registers in a same checking group (e.g., a parity checking group) and may have parity with one another.

Based on the set of latch groups, the placement component 140 incrementally places the plurality of latches. In some embodiments, the placement component 140 incrementally places the plurality of latches by selecting a first latch group. The first latch group may be selected based on a set of latch group sizes. For example, the first latch group may be selected as a latch group having a largest latch group size of the set of latch groups.

The placement component 140 places a first latch of the plurality of latches in the chip design. For example, the first latch 306 may be placed in the chip design 300 of FIG. 3A. The first latch may be associated with the first latch group. For example, the first latch 306 may be associated with the first latch group (G1) in FIG. 3A. Placement of a latch may be considered an increment in the operation 250. In some instances, at each increment of placing a latch (e.g., FIG. 3A, FIG. 3B, and FIG. 3C), the placement component 140 compares a latch or a potential latch placement against the set of chip design constraints. In such instances, the placement component 140 may select a placement for the first latch according to a predefined constraint. The placement component 140 may also select the placement of the first latch based on one or more design metrics for the chip design. Where a latch placement abides the by the relevant constraints, the placement component 140 places the first latch. Where the latch placement fails to abide by the relevant constraints, the placement component 140 may move to a next largest latch group and determine whether to place a latch from the next largest latch group in specified latch placement area or leave the latch placement area as empty space. In some instances, the placement component 140 may override the constraints and crease a multi-bit flip violation, flagging the placement for further review by the storage element placement system 102, review by a user, or replacement by another placement algorithm.

In some embodiments, the placement component 140 determines or selects a subsequent latch group based on the set of latch group sizes. The subsequent latch group may be determined or selected as a latch group with the largest size, after the latch was placed from the first latch group. The subsequent latch group may be a different latch group than the first latch group associated with a different parity checking group.

Figure 3B:
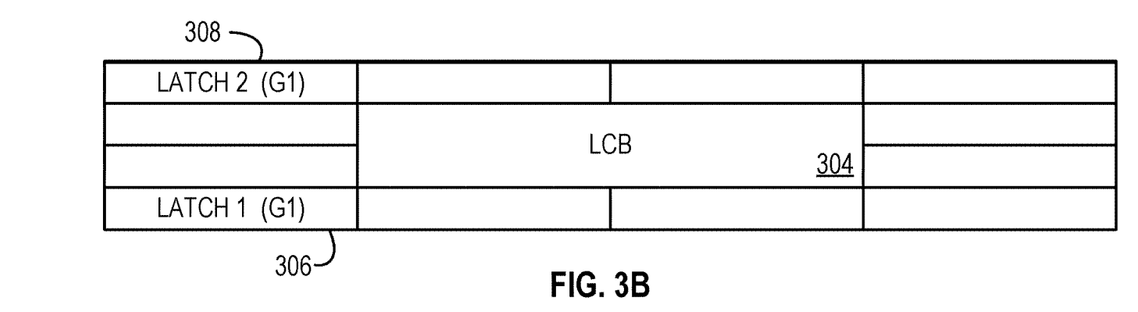
FIG. 3B depicts a block diagram of latch placement in an integrated circuit, according to at least one embodiment.

The placement component 140 may then place the subsequent latch of the plurality of latches in the chip design. For example, a subsequent latch 308 (i.e., latch 2 308) may be placed as shown in FIG. 3B. In some embodiments, the placement component places the subsequent latch by determining the first latch group and the second latch group are a same latch group. For example, the first latch group may be latch group G1 and the second latch group may be latch group G1, as shown in FIG. 3B. The placement component 140 may then select a latch placement for the subsequent latch that is a predetermined distance from the first latch.

For example, for each slot or placement into which a latch will be placed, the placement component 140 may sort the latch groups by size or remaining latches contained in each latch group. After placement of a first latch, the placement component 140 may select a latch from the next largest latch group, and repeat until all latches are placed or an error occurs. In some instances, the placement component 140 incorporates a greedy post-fixup algorithm to circumvent errors or restrictions on ordering of latch placement.

In embodiments where the placement component 140 employs an integer solving scheme, the placement component places the plurality of latches by generating an integer formulation for the plurality of latches and a set of latch groups. The placement component 140 may generate the integer formulation by reforming the latches or registers and checking groups as part of a formulation that can be solved using integer linear programming. The placement component 140 may use any suitable and relevant integer linear solver package to evaluate the solution of the formulation.

In some embodiments, the placement component 140 generates a set of latch maps for the plurality of latches based on the integer formulation. The latch maps may be potential placement of latches based on the integer formulation. Each latch map may represent a valid solution to solving for latch placement using an integer linear programming package.

The placement component 140 selects a latch map of the set of latch maps based on the set of chip design constraints and a set of integer weights of the integer formulation. Further, the placement component 140 may incorporate any design considerations, constraints, or additional weights in the formulation to solve for placement of the plurality of latches. The set of integer weights may be a weighting scheme generated to account for latch placement preferences by the constraints or other relevant design considerations.

For example, where three colors or groups of latches A, B, and C exist, a plurality of latches may be assigned to each group. In this example, group A may be represented as $|A|=k_A$; (Set A has $k_A$ latches). Group B may be represented as $|B|=k_B$; (Set A has $k_B$ latches). Group C may be represented as $|C|=k_c$; (Set A has $k_c$ latches). In the example, there may be M latch slots labeled as $L^1, L^2, \ldots, L^M$. The placement component 140 may attempt to assign latches to slots such that north/south neighbors are not the same type of latch, reducing or eliminating multi-bit flip potential. For each slot $L^i$, three variables are created $L_A^i, L_B^i, L_C^i$. The value of all variables are either zero or one, such that $L_A^i=0$ or 1; $L_B^i=0$ or 1; $L_C^i=0$ or 1. Each slot may only host one latch. The slots hosting may be represented as $L_A^i+L_B^i+L_C^i \leq 1$ i=[1 ... M]. The number of each latch type may be equal to the latch number. For example, the number of each latch type may be represented as $L_A^1+L_A^2+ \ldots +L_A^M=k_A$, $L_B^1+L_B^2+ \ldots +L_B^M=k_B$, and $L_C^1+L_C^2+ \ldots +L_C^M=k_C$. In this example, neighboring constraints may exist. The neighboring constraints may be that $L^i$ and $L^j$ cannot have the same latch type. The neighboring constraints may be represented as $L_A^i+L_A^j<2$, $L_B^i+L_B^j<2$, and $L_C^i+L_C^j<2$. A cost function may be added to indicate a location preference for certain types of latches and may be included in the integer formulation. For example, where a type is preferred for placement at $L_i$, a cost $C_A$ is assigned to $L_A^i$, such that a cost may be represented as $\max(C_A \cdot L_A^i)$. As described above, the integer solving scheme enables the placement component 140 to place the plurality of latches into valid placements or positions, meeting firm requirements (e.g., no close neighbors). The integer solving scheme may simultaneously enable the placement component 140 to optimize latch placement for other requirements or desired formulations (e.g., minimized wire lengths or closeness to an original location).

In some embodiments, upon determining placement of the plurality of latches, the storage element placement system 102 generates a final chip design. The final chip design incorporates the chip design for the integrated circuit identified in operation 210 and a finalized latch placement for the plurality of latches. In some embodiments, the storage element placement system 102 fabricates a chip or an integrated circuit corresponding to the chip design and the placement of the plurality of latches or the final chip design. The storage element placement system 102 may fabricate the chip using an automated chip fabrication system. The automated chip fabrication system may incorporate one or more physical machines, robots, and computing systems to fabricate chips or integrated circuits from one or more physical components or one or more raw materials.

Figure 4:
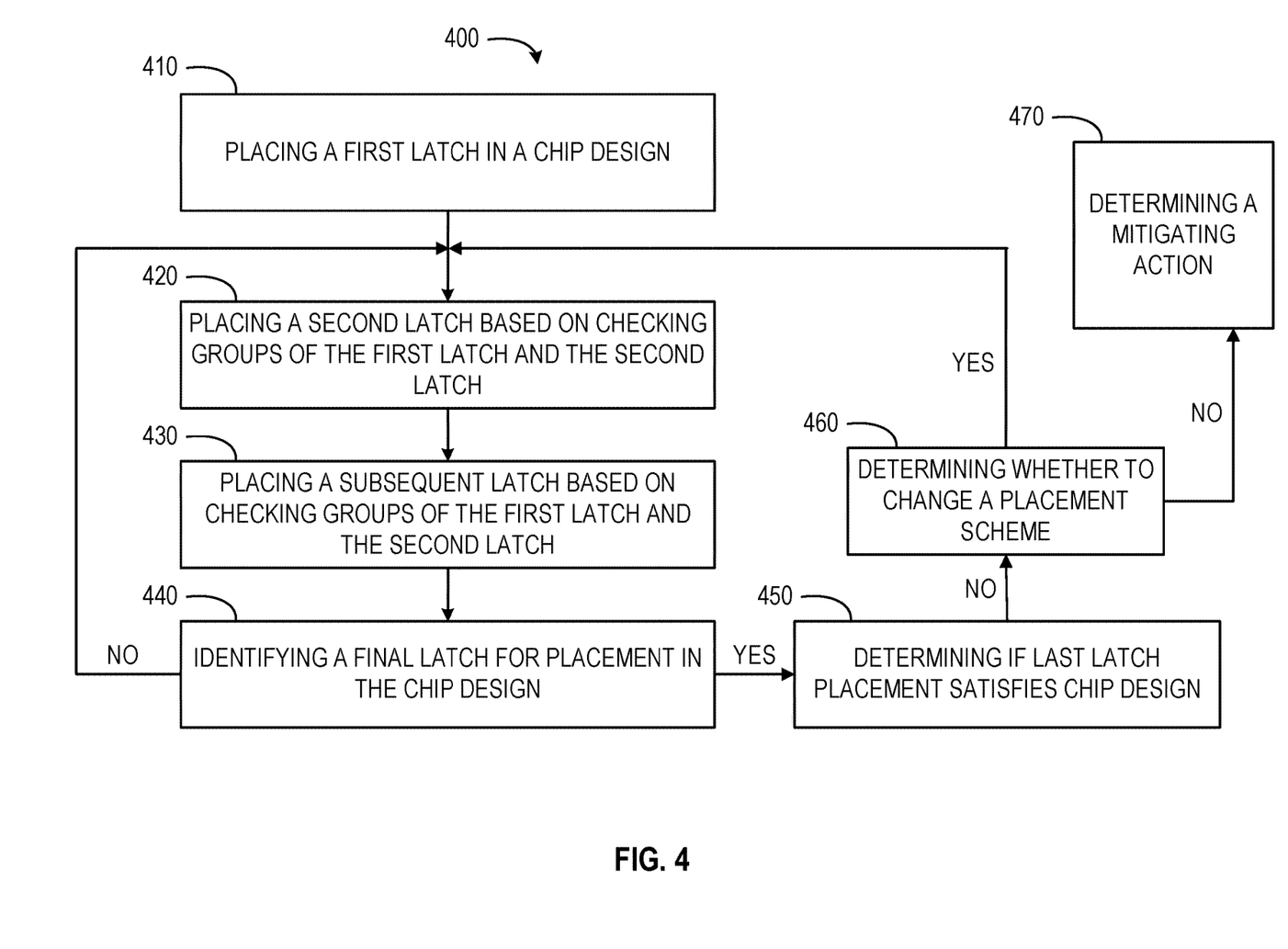
FIG. 4 depicts a flow diagram of a computer-implemented method for bit flip aware latch placement in integrated circuit generation, according to at least one embodiment.

FIG. 4 shows a flow diagram of an embodiment of a computer-implemented method 400 for bit flip aware latch placement in integrated circuit generation. The method 400 may be performed by or within the computing environment 100. In some embodiments, the method 400 comprises or incorporates one or more operations of the method 200. In some instances, operations of the method 400 may be incorporated as part of or sub-operations of the method 200

In operation 410, the placement component 140 places a first latch in a circuit design. The first latch may be placed in a manner similar to or the same as described above with respect to operation 250.

In operation 420, the placement component 140 places a second latch. The second latch may be placed in the circuit design from a same checking group as the first latch. In such instances, the second latch is placed at a distance from the first latch. The distance may be determined as a distance between the first latch and the second latch to prevent multi-bit flip errors while fitting the specified number of latches, across different size parity buckets, into a bounded area with a specified percentage of the latches being interleaved.

Figure 3C:
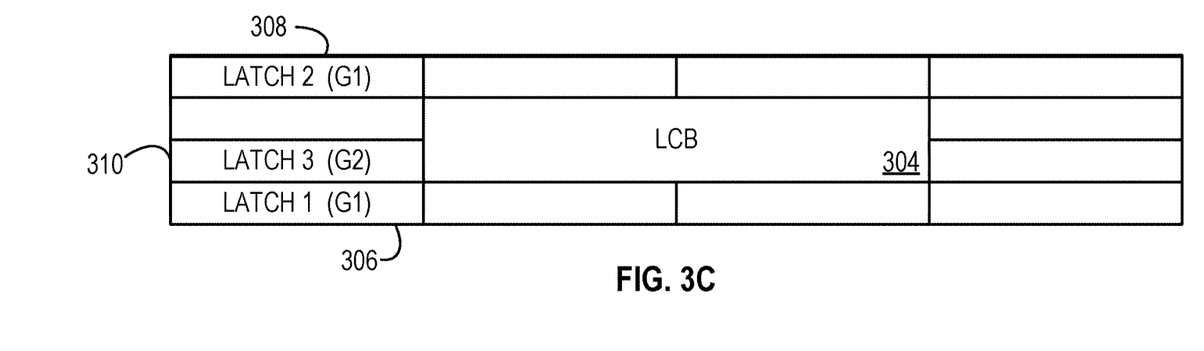
FIG. 3C depicts a block diagram of latch placement in an integrated circuit, according to at least one embodiment.

In operation 430, the placement component 140 places a subsequent latch based on a checking group of the first latch and the second latch. Where the subsequent latch is a same checking group as the first latch or the second latch, the subsequent latch is placed a distance of one or more of the first latch and the second latch. Where the subsequent latch is a different checking group than the first latch and the second latch, the placement component 140 places the subsequent latch between the first latch and the second latch. For example, as shown in FIG. 3C, the first latch (i.e., Latch 1 306) may be placed a distance away from the second latch (i.e., Latch 2 308) due to the first latch and the second latch sharing a checking group or latch group (i.e., G1). However, the subsequent latch (i.e., Latch 3 310) may be placed near the first latch (i.e., Latch 1 306) given that the checking group or the latch group of the first latch (e.g., G1) and the subsequent latch (e.g., G2) are different.

As discussed above, in some embodiments, the placement component 140 places latches in physically interleaved placement. Spaces between parity protected latches may be used for placing other latches from other parity groups. Latches which do not need protection may be interspersed, by the placement component 140, in between critical latches. White spaces may be interspersed between critical latches. In some embodiments, white spaces may be used when no other solutions are identified as viable. The placement component 140 may iteratively place latches to meet packing density requirements of the chip design.

In operation 440, the placement component 140 identifies a final latch for placement within the chip design. Where the latch to be placed is not a final latch, the placement component 140 continues placing latches within the chip design. Where the latch to be placed is a final latch, the placement component 140 identifies a latch placement for the final latch and continues to operation 450.

In operation 450, the placement component 140 determines if the latch placement of the final latch satisfies the set of chip design constraints of the chip design. Where the latch placement of the final latch satisfies the set of chip design constraints, the operations of the method 400 may terminate. Where the latch placement of the final latch fails the set of chip design constraints, the placement component 140 continues to operation 460.

In operation 460, the placement component 140 determines whether to change a placement scheme. In such instances, the placement scheme used to place the first latch may be a first placement scheme. The placement component 140 may select a second placement scheme in response to the final latch failing to meet the set of chip design constraints. Where the second placement scheme is selected, the placement component 140 may continue to place at least the final latch according to the second placement scheme. In some embodiments, selection of the second placement scheme triggers selection and placement of a subset of latches, including the final latch to comply with the set of chip design constraints. In embodiments where the placement component 140 does not select the second placement scheme or cannot select the second placement scheme, the placement component 140 may continue to operation 470.

In operation 470, the placement component 140 determines a mitigating action in response to the final latch placement failing the set of chip design constraints. In some embodiments, the placement component 140 selects an exception as a mitigation action. In some instances, the placement component 140 requests a waiver as a mitigation action. The placement component 140 may also request manual interaction as a mitigation action. Mitigation actions may be automatic or manual. In some instances, once a placement issue arises and triggers a mitigation action, the placement component 140 generates an automated mitigation report detailing the placement issue and any violated constraints.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
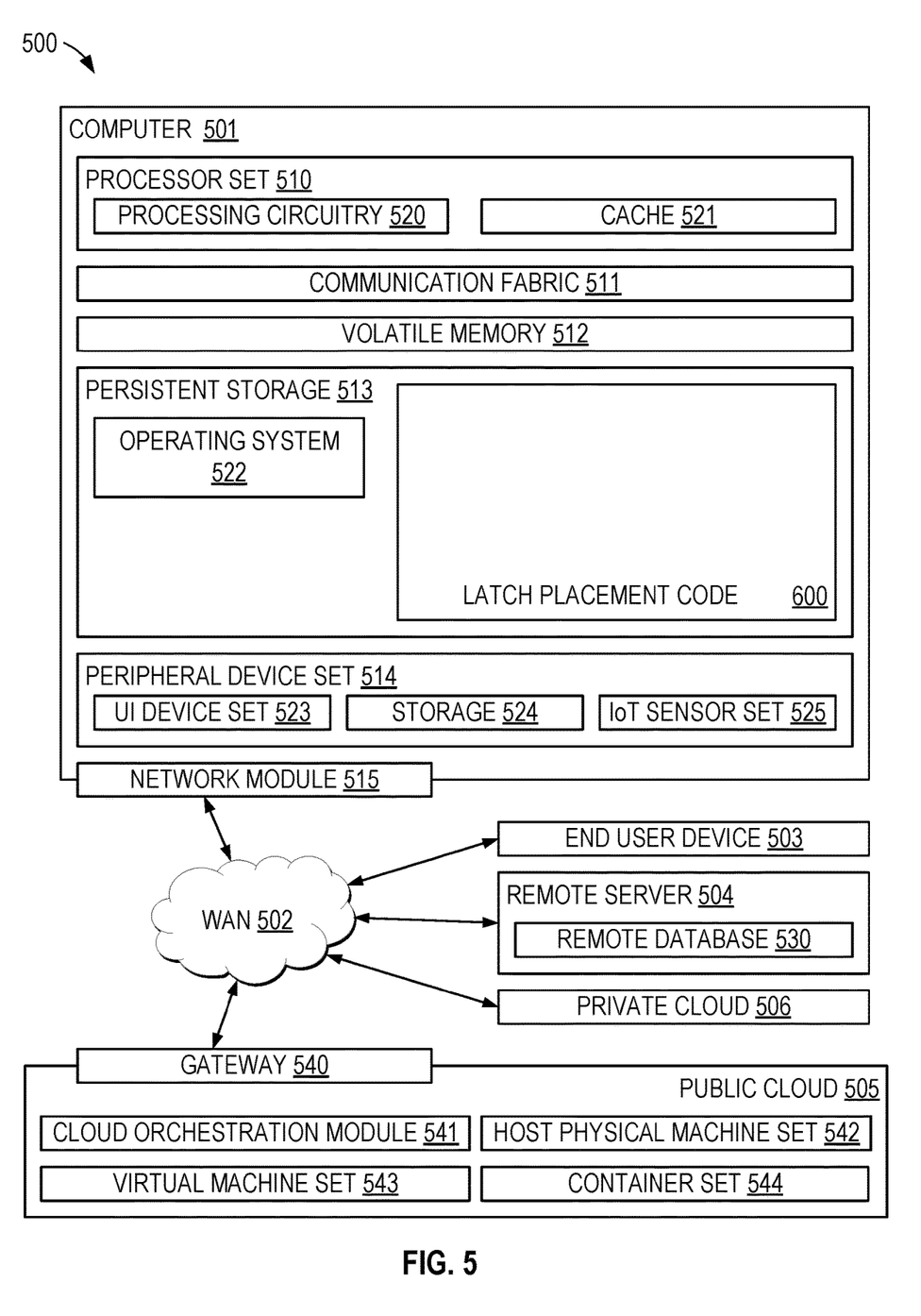
FIG. 5 depicts a schematic diagram of a computing environment for executing program code related to the methods disclosed for bit flip aware latch placement in integrated circuit generation, according to at least one embodiment.

Embodiments of the present disclosure may be implemented together with virtually any type of computer, regardless of the platform is suitable for storing and/or executing program code. FIG. 5 shows, as an example, a computing environment 500 (e.g., cloud computing system) suitable for executing program code related to the methods disclosed herein and bit flip aware latch placement in integrated circuit generation. In some embodiments, the computing environment 500 may be the same as or an implementation of the computing environment 100.

Computing environment 500 contains an example of an environment for the execution of at least some of the computer code involved in performing the inventive methods, such as latch placement code 600. The latch placement code 600 may be a code-based implementation of the storage element placement system 102. In addition to latch placement code 600, computing environment 500 includes, for example, a computer 501, a wide area network (WAN) 502, an end user device (EUD) 503, a remote server 504, a public cloud 505, and a private cloud 506. In this embodiment, the computer 501 includes a processor set 510 (including processing circuitry 520 and a cache 521), a communication fabric 511, a volatile memory 512, a persistent storage 513 (including operating a system 522 and the latch placement code 600, as identified above), a peripheral device set 514 (including a user interface (UI) device set 523, storage 524, and an Internet of Things (IoT) sensor set 525), and a network module 515. The remote server 504 includes a remote database 530. The public cloud 505 includes a gateway 540, a cloud orchestration module 541, a host physical machine set 542, a virtual machine set 543, and a container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 530. As is well understood in the art of computer technology, and depending upon the technology, performance of a computer-implemented method may be distributed among multiple computers and/or between multiple locations. On the other hand, in this presentation of the computing environment 500, detailed discussion is focused on a single computer, specifically the computer 501, to keep the presentation as simple as possible. The computer 501 may be located in a cloud, even though it is not shown in a cloud in FIG. 1. On the other hand, the computer 501 is not required to be in a cloud except to any extent as may be affirmatively indicated.

The processor set 510 includes one, or more, computer processors of any type now known or to be developed in the future. The processing circuitry 520 may be distributed over multiple packages, for example, multiple, coordinated integrated circuit chips. The processing circuitry 520 may implement multiple processor threads and/or multiple processor cores. The cache 521 is memory that is located in the processor chip package(s) and is typically used for data or code that should be available for rapid access by the threads or cores running on the processor set 510. Cache memories are typically organized into multiple levels depending upon relative proximity to the processing circuitry. Alternatively, some, or all, of the cache for the processor set may be located "off chip." In some computing environments, the processor set 510 may be designed for working with qubits and performing quantum computing.

Computer readable program instructions are typically loaded onto the computer 501 to cause a series of operational steps to be performed by the processor set 510 of the computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 521 and the other storage media discussed below. The program instructions, and associated data, are accessed by the processor set 510 to control and direct performance of the inventive methods. In the computing environment 500, at least some of the instructions for performing the inventive methods may be stored in the latch placement code 600 in the persistent storage 513.

The communication fabric 511 is the signal conduction path that allows the various components of the computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 512 is any type of volatile memory now known or to be developed in the future. Examples include dynamic type random access memory (RAM) or static type RAM. Typically, the volatile memory 512 is characterized by random access, but this is not required unless affirmatively indicated. In the computer 501, the volatile memory 512 is located in a single package and is internal to the computer 501, but, alternatively or additionally, the volatile memory may be distributed over multiple packages and/or located externally with respect to the computer 501.

The persistent storage 513 is any form of non-volatile storage for computers that is now known or to be developed in the future. The non-volatility of this storage means that the stored data is maintained regardless of whether power is being supplied to the computer 501 and/or directly to the persistent storage 513. The persistent storage 513 may be a read only memory (ROM), but typically at least a portion of the persistent storage allows writing of data, deletion of data and re-writing of data. Some familiar forms of persistent storage include magnetic disks and solid-state storage devices. The operating system 522 may take several forms, such as various known proprietary operating systems or open-source Portable Operating System Interface-type operating systems that employ a kernel. The code included in the latch placement code 600 typically includes at least some of the computer code involved in performing the inventive methods.

The peripheral device set 514 includes the set of peripheral devices of the computer 501. Data communication connections between the peripheral devices and the other components of the computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 523 may include components such as a display screen, speaker, microphone, wearable devices (such as goggles and smart watches), keyboard, mouse, printer, touchpad, game controllers, and haptic devices. The storage 524 is external storage, such as an external hard drive, or insertable storage, such as an SD card. The storage 524 may be persistent and/or volatile. In some embodiments, the storage 524 may take the form of a quantum computing storage device for storing data in the form of qubits. In embodiments where the computer 501 is required to have a large amount of storage (for example, where the computer 501 locally stores and manages a large database) then this storage may be provided by peripheral storage devices designed for storing very large amounts of data, such as a storage area network (SAN) that is shared by multiple, geographically distributed computers. The IoT sensor set 525 is made up of sensors that can be used in Internet of Things applications. For example, one sensor may be a thermometer and another sensor may be a motion detector.

The network module 515 is the collection of computer software, hardware, and firmware that allows the computer 501 to communicate with other computers through the WAN 502. The network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 515 are performed on the same physical hardware device. In other embodiments (for example, embodiments that utilize software-defined networking (SDN)), the control functions and the forwarding functions of the network module 515 are performed on physically separate devices, such that the control functions manage several different network hardware devices. Computer readable program instructions for performing the inventive methods can typically be downloaded to the computer 501 from an external computer or external storage device through a network adapter card or network interface included in the network module 515.

The WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 503 is any computer system that is used and controlled by an end user (for example, a customer of an enterprise that operates the computer 501), and may take any of the forms discussed above in connection with the computer 501. The EUD 503 typically receives helpful and useful data from the operations of the computer 501. For example, in a hypothetical case where the computer 501 is designed to provide a recommendation to an end user, this recommendation would typically be communicated from the network module 515 of the computer 501 through the WAN 502 to the EUD 503. In this way, the EUD 503 can display, or otherwise present, the recommendation to an end user. In some embodiments, the EUD 503 may be a client device, such as thin client, heavy client, mainframe computer, desktop computer and so on.

The remote server 504 is any computer system that serves at least some data and/or functionality to the computer 501. The remote server 504 may be controlled and used by the same entity that operates computer 501. The remote server 504 represents the machine(s) that collect and store helpful and useful data for use by other computers, such as the computer 501. For example, in a hypothetical case where the computer 501 is designed and programmed to provide a recommendation based on historical data, then this historical data may be provided to the computer 501 from the remote database 530 of the remote server 504.

The public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 505 is performed by the computer hardware and/or software of the cloud orchestration module 541. The computing resources provided by the public cloud 505 are typically implemented by virtual computing environments that run on various computers making up the computers of the host physical machine set 542, which is the universe of physical computers in and/or available to the public cloud 505. The virtual computing environments (VCEs) typically take the form of virtual machines from the virtual machine set 543 and/or containers from the container set 544. It is understood that these VCEs may be stored as images and may be transferred among and between the various physical machine hosts, either as images or after instantiation of the VCE. The cloud orchestration module 541 manages the transfer and storage of images, deploys new instantiations of VCEs and manages active instantiations of VCE deployments. The gateway 540 is the collection of computer software, hardware, and firmware that allows the public cloud 505 to communicate through the WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 506 is similar to the public cloud 505, except that the computing resources are only available for use by a single enterprise. While the private cloud 506 is depicted as being in communication with the WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 505 and the private cloud 506 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments, one or more of the operating system 522 and the latch placement code 600 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a chip design for an integrated circuit;
   identifying a set of chip design constraints associated with the chip design;
   determining a set of error-checking groups associated with a plurality of latches to be placed in the chip design;
   selecting, based on the set of chip design constraints and the set of error-checking groups, a placement scheme for the plurality of latches, wherein the placement scheme is configured to prevent abutting placement of two latches associated with a same error-checking group; and
   placing the plurality of latches within the chip design based on the placement scheme and the set of error-checking groups.

2. The method of claim 1, wherein the placement scheme is selected from the group consisting of a latch grouping scheme and an integer solving scheme.

3. The method of claim 2, wherein the placement scheme is the latch grouping scheme and placing the plurality of latches further comprises:
   grouping each of the plurality of latches into one of a set of latch groups based on the set of error-checking groups; and
   incrementally placing each of the plurality of latches based on the set of latch groups, each increment comparing placement of a latch against the set of chip design constraints.

4. The method of claim 3, wherein incrementally placing each of the plurality of latches further comprises:
   selecting a first latch group based on a set of latch group sizes;
   placing a first latch of the plurality of latches in the chip design, the first latch associated with the first latch group;
   selecting a subsequent latch group based the set of latch group sizes; and
   placing a subsequent latch of the plurality of latches in the chip design.

5. The method of claim 4, wherein placing the subsequent latch further comprises:
   determining the first latch group and the subsequent latch group are a same latch group; and
   selecting a latch placement for the subsequent latch that is a predetermined distance from the first latch.

6. The method of claim 2, wherein the placement scheme is the integer solving scheme and placing the plurality of latches further comprises:
   generating an integer formulation for the plurality of latches and a set of latch groups;
   generating a set of latch maps for the plurality of latches based on the integer formulation; and
   selecting a latch map of the set of latch maps based on the set of chip design constraints and a set of integer weights of the integer formulation.

7. The method of claim 1, wherein the placement scheme is a first placement scheme, the method further comprising:
   identifying a final latch for placement within the chip design;
   determining a final placement of the final latch within the chip design; and
   based on the set of chip design constraints and the final placement, selecting a second placement scheme for a subset of latches of the plurality of latches.

8. A system, comprising:
   one or more processors; and
   a computer-readable storage medium, coupled to the one or more processors, storing program instructions that, when executed by the one or more processors, cause the one or more processors to perform operations comprising:
   identifying a chip design for an integrated circuit;
   identifying a set of chip design constraints associated with the chip design;
   determining a set of error-checking groups associated with a plurality of latches to be placed in the chip design;
   selecting, based on the set of chip design constraints and the set of error-checking groups, a placement scheme for the plurality of latches, wherein the placement scheme is configured to prevent abutting placement of two latches associated with a same error-checking group; and placing the plurality of latches within the chip design based on the placement scheme and the set of error-checking groups.

9. The system of claim 8, wherein the placement scheme is selected from the group consisting of a latch grouping scheme and an integer solving scheme.

10. The system of claim 9, wherein the placement scheme is the latch grouping scheme and placing the plurality of latches further comprises:

grouping each of the plurality of latches into one of a set of latch groups based on the set of error-checking groups; and incrementally placing each of the plurality of latches based on the set of latch groups, each increment comparing placement of a latch against the set of chip design constraints.

11. The system of claim 10, wherein incrementally placing each of the plurality of latches further comprises:

selecting a first latch group based on a set of latch group sizes;

placing a first latch of the plurality of latches in the chip design, the first latch associated with the first latch group;

selecting a subsequent latch group based the set of latch group sizes; and placing a subsequent latch of the plurality of latches in the chip design.

12. The system of claim 11, wherein placing the subsequent latch further comprises:

determining the first latch group and the subsequent latch group are a same latch group; and selecting a latch placement for the subsequent latch that is a predetermined distance from the first latch.

13. The system of claim 9, wherein the placement scheme is the integer solving scheme and placing the plurality of latches further comprises:

generating an integer formulation for the plurality of latches and a set of latch groups;

generating a set of latch maps for the plurality of latches based on the integer formulation; and selecting a latch map of the set of latch maps based on the set of chip design constraints and a set of integer weights of the integer formulation.

14. The system of claim 8, wherein the placement scheme is a first placement scheme, the operations further comprising:

identifying a final latch for placement within the chip design;

determining a final placement of the final latch within the chip design; and based on the set of chip design constraints and the final placement, selecting a second placement scheme for a subset of latches of the plurality of latches.

15. A computer program product comprising a computer readable storage medium having program instructions embodied therewith, the program instructions being executable by one or more processors to cause the one or more processors to perform operations comprising:

identifying a chip design for an integrated circuit;

identifying a set of chip design constraints associated with the chip design;

determining a set of error-checking groups associated with a plurality of latches to be placed in the chip design;

selecting, based on the set of chip design constraints and the set of error-checking groups, a placement scheme for the plurality of latches, wherein the placement scheme is configured to prevent abutting placement of two latches associated with a same error-checking group; and placing the plurality of latches within the chip design based on the placement scheme and the set of error-checking groups.

16. The computer program product of claim 15, wherein the placement scheme is a latch grouping scheme and placing the plurality of latches further comprises:

grouping each of the plurality of latches into one of a set of latch groups based on the set of error-checking groups; and incrementally placing each of the plurality of latches based on the set of latch groups, each increment comparing placement of a latch against the set of chip design constraints.

17. The computer program product of claim 16, wherein incrementally placing each of the plurality of latches further comprises:

selecting a first latch group based on a set of latch group sizes;

placing a first latch of the plurality of latches in the chip design, the first latch associated with the first latch group;

selecting a subsequent latch group based the set of latch group sizes; and placing a subsequent latch of the plurality of latches in the chip design.

18. The computer program product of claim 17, wherein placing the subsequent latch further comprises:

determining the first latch group and the subsequent latch group are a same latch group; and selecting a latch placement for the subsequent latch that is a predetermined distance from the first latch.

19. The computer program product of claim 15, wherein the placement scheme is an integer solving scheme and placing the plurality of latches further comprises:

generating an integer formulation for the plurality of latches and a set of latch groups;

generating a set of latch maps for the plurality of latches based on the integer formulation; and selecting a latch map of the set of latch maps based on the set of chip design constraints and a set of integer weights of the integer formulation.

20. The computer program product of claim 15, wherein the placement scheme is a first placement scheme, the operations further comprising:

identifying a final latch for placement within the chip design;

determining a final placement of the final latch within the chip design; and based on the set of chip design constraints and the final placement, selecting a second placement scheme for a subset of latches of the plurality of latches.

* * * * *